(12) United States Patent
Hicke et al.

(10) Patent No.: US 10,711,435 B2
(45) Date of Patent: Jul. 14, 2020

(54) FRAME ASSEMBLY FOR MACHINE

(71) Applicant: Caterpillar Inc., Peoria, IL (US)

(72) Inventors: Joshua Daniel Hicke, Morton, IL (US); Andrew Charles Boen, Peoria, IL (US); Christopher R Beasley, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 316 days.

(21) Appl. No.: 15/227,036

(22) Filed: Aug. 3, 2016

(65) Prior Publication Data
US 2018/0038072 A1 Feb. 8, 2018

(51) Int. Cl.
B62D 21/02 (2006.01)
E02F 9/08 (2006.01)
E02F 3/76 (2006.01)

(52) U.S. Cl.
CPC ............ *E02F 9/0816* (2013.01); *B62D 21/02* (2013.01); *E02F 9/08* (2013.01); *E02F 9/0808* (2013.01); *E02F 3/7604* (2013.01)

(58) Field of Classification Search
CPC ....... E02F 9/0808; E02F 9/0816; E02F 3/382; E02F 9/08; E02F 9/0825; E02F 9/10; B62D 21/02; B62D 21/05; B62D 21/03; B62D 21/186
See application file for complete search history.

(56) References Cited

U.S. PATENT DOCUMENTS

| | | | | |
|---|---|---|---|---|
| 1,629,890 A * | 5/1927 | Ronk | .................. | E02F 9/02 |
| | | | | 105/215.1 |
| 3,039,730 A * | 6/1962 | Heigl | .................. | B62D 55/062 |
| | | | | 156/295 |
| 3,679,196 A | 7/1972 | Royer | | |
| 3,910,367 A | 10/1975 | Drone et al. | | |
| 4,014,400 A * | 3/1977 | Cline | .................. | E02F 9/10 |
| | | | | 180/9.1 |
| 4,120,511 A * | 10/1978 | Allen | .................. | B62D 21/186 |
| | | | | 280/795 |
| 4,191,401 A * | 3/1980 | Krolak | .................. | B62D 21/186 |
| | | | | 280/781 |
| 4,231,699 A * | 11/1980 | Thompson | .................. | B62D 55/10 |
| | | | | 180/9.1 |
| 4,397,481 A * | 8/1983 | Dion | .................. | B62D 21/186 |
| | | | | 280/781 |
| 5,176,267 A * | 1/1993 | Pech | .................. | B66C 23/84 |
| | | | | 212/180 |
| 5,823,279 A * | 10/1998 | Petzold | .................. | B62D 55/084 |
| | | | | 180/9.1 |

(Continued)

FOREIGN PATENT DOCUMENTS

GB 155093 12/1920

*Primary Examiner* — Barry Gooden, Jr.
(74) *Attorney, Agent, or Firm* — Oblon, McClelland, Maier & Neustadt

(57) ABSTRACT

A frame assembly for a machine includes a main frame and a crossmember. The main frame includes first pair of rails and a second pair of rails laterally spaced from the first pair of rails. Each of the first pair of rails and the second pair of rails includes a first rail and a second rail vertically spaced from the first rail. The crossmember includes a first flange connected to both the first rail and second rail of the first pair of rails. The crossmember further includes a second flange connected to both the first rail and the second rail of the second pair of rails.

12 Claims, 3 Drawing Sheets

(56) References Cited

U.S. PATENT DOCUMENTS

| | | | | |
|---|---|---|---|---|
| 6,098,739 A * | 8/2000 | Anderson | B62D 21/186 | 180/312 |
| 6,145,610 A * | 11/2000 | Gallignani | B62D 55/084 | 180/9.48 |
| 6,158,525 A * | 12/2000 | Inoue | B62D 21/186 | 172/776 |
| 6,564,892 B2 * | 5/2003 | Wooldridge | B60K 5/12 | 180/300 |
| 6,905,139 B2 * | 6/2005 | Akahane | B62D 21/16 | 220/564 |
| 7,802,815 B2 * | 9/2010 | Brindle | B62D 21/186 | 180/9.23 |
| 7,997,619 B2 * | 8/2011 | Sugimoto | B62D 21/186 | 280/124.109 |
| 9,604,680 B2 * | 3/2017 | Tochigi | B62D 21/186 | |
| 9,610,985 B2 * | 4/2017 | Tochigi | B62D 21/186 | |
| 10,507,870 B2 * | 12/2019 | Moen | B62D 21/186 | |
| 10,513,294 B2 * | 12/2019 | Schwalbe | B62D 21/186 | |
| 2003/0150138 A1 * | 8/2003 | Akahane | B62D 21/16 | 37/347 |
| 2004/0026153 A1 * | 2/2004 | Dershem | B62D 21/186 | 180/311 |
| 2005/0172527 A1 * | 8/2005 | Mimuro | B62D 21/186 | 37/466 |
| 2007/0216147 A1 * | 9/2007 | Ramsey | B60G 7/02 | 280/781 |
| 2008/0284245 A1 * | 11/2008 | Livesay | B62D 55/14 | 305/193 |
| 2009/0084188 A1 * | 4/2009 | Seitz | G01M 3/3272 | 73/799 |
| 2009/0121521 A1 * | 5/2009 | Sakamoto | B62D 21/186 | 296/203.01 |
| 2009/0200785 A1 * | 8/2009 | Weibling | B62D 21/186 | 280/781 |
| 2009/0211833 A1 * | 8/2009 | Lee | E02F 9/0816 | 180/311 |
| 2009/0230731 A1 * | 9/2009 | Sakamoto | B62D 21/186 | 296/204 |
| 2011/0036649 A1 * | 2/2011 | Cho | E02F 9/024 | 180/9.5 |
| 2013/0113182 A1 * | 5/2013 | Keatley | B60D 1/015 | 280/495 |
| 2013/0277125 A1 | 10/2013 | Moser | | |
| 2014/0035257 A1 * | 2/2014 | Van Der Knaap | B62D 21/02 | 280/438.1 |
| 2014/0049033 A1 * | 2/2014 | Yee | B62D 21/09 | 280/797 |
| 2014/0062047 A1 * | 3/2014 | Van Der Knaap | B62D 21/02 | 280/124.109 |
| 2015/0001894 A1 * | 1/2015 | Outen | B62D 21/02 | 296/204 |
| 2015/0008658 A1 * | 1/2015 | Keatley | B62D 21/02 | 280/495 |
| 2015/0151577 A1 * | 6/2015 | Tipton | B60B 35/005 | 280/124.116 |
| 2015/0175206 A1 * | 6/2015 | Scheper | B62D 21/02 | 296/204 |
| 2015/0233090 A1 * | 8/2015 | Muthusamy | E02F 9/123 | 414/687 |
| 2016/0053459 A1 * | 2/2016 | Webb | E02F 9/163 | 414/685 |
| 2016/0090711 A1 * | 3/2016 | Sumiyoshi | B60K 5/02 | 180/291 |
| 2016/0121929 A1 * | 5/2016 | Levin | B60G 7/02 | 296/193.02 |
| 2016/0201292 A1 * | 7/2016 | Ducheneaux | E02F 9/02 | 296/193.01 |
| 2016/0243990 A1 * | 8/2016 | Portney | B60R 3/00 | |
| 2016/0281325 A1 * | 9/2016 | Miyata | B62D 55/06 | |
| 2016/0332511 A1 * | 11/2016 | Hicke | B60K 5/12 | |
| 2016/0356016 A1 * | 12/2016 | Hicke | E02F 9/0808 | |
| 2017/0217513 A1 * | 8/2017 | Keatley | B62D 21/02 | |
| 2017/0314229 A1 * | 11/2017 | Capraro | B62D 33/077 | |

* cited by examiner

FRAME ASSEMBLY FOR MACHINE

TECHNICAL FIELD

The present disclosure relates to a frame assembly for a machine, and more particularly to the frame assembly having a crossmember.

BACKGROUND

Machines, such as track type machines, typically include a main frame having a crossmember coupled to horizontally spaced tracks. Each end of the crossmember member is coupled to a box assembly of the main frame to transfer a load from the tracks to the box assembly. The box assembly may include an upper rail and a lower rail to absorb the load transferred to the box assembly. In an exemplary instance, the load is transferred from the crossmember to the lower rail and, in turn, the load is transferred to the upper rail through various reinforcement structures disposed between the lower rail and the upper rail. However, fabrication and assembly of the reinforcement structures may involve inefficient manufacturing processes, leading to increased cost of the machine.

U.S. Pat. No. 3,910,367 discloses a machine having a main frame including two laterally spaced apart longitudinal members in the form of box girders. The machine also includes a cross member assembly extending between the longitudinal members and secured to the longitudinal members. The cross member assembly is connected to a bottom plate and a side plate of each of the box girders.

SUMMARY OF THE INVENTION

According to an aspect, a frame assembly for a machine is disclosed. The frame assembly includes a main frame having a first pair of rails and a second pair of rails laterally spaced from the first pair of rails. Further, each of the first pair of rails and the second pair of rails includes a first rail and a second rail vertically spaced from the first rail. The frame assembly further includes a crossmember having a first flange and a second flange. The first flange is connected to both the first rail and the second rail of the first pair of rails, and the second flange is connected to both the first rail and the second rail of the second pair of rails.

In yet another aspect, a machine is disclosed. The machine includes a main frame having a first pair of rails and a second pair of rails laterally spaced from the first pair of rails. Each of the first pair of rails and the second pair of rails includes a first rail and a second rail vertically spaced from the first rail. The machine further includes a crossmember having a first flange and a second flange. The first flange is secured to both the first rail and the second rail of the first pair of rails, and the second flange is secured to both the first rail and the second rail of the second pair of rails.

DETAILED DESCRIPTION

Figure 1:
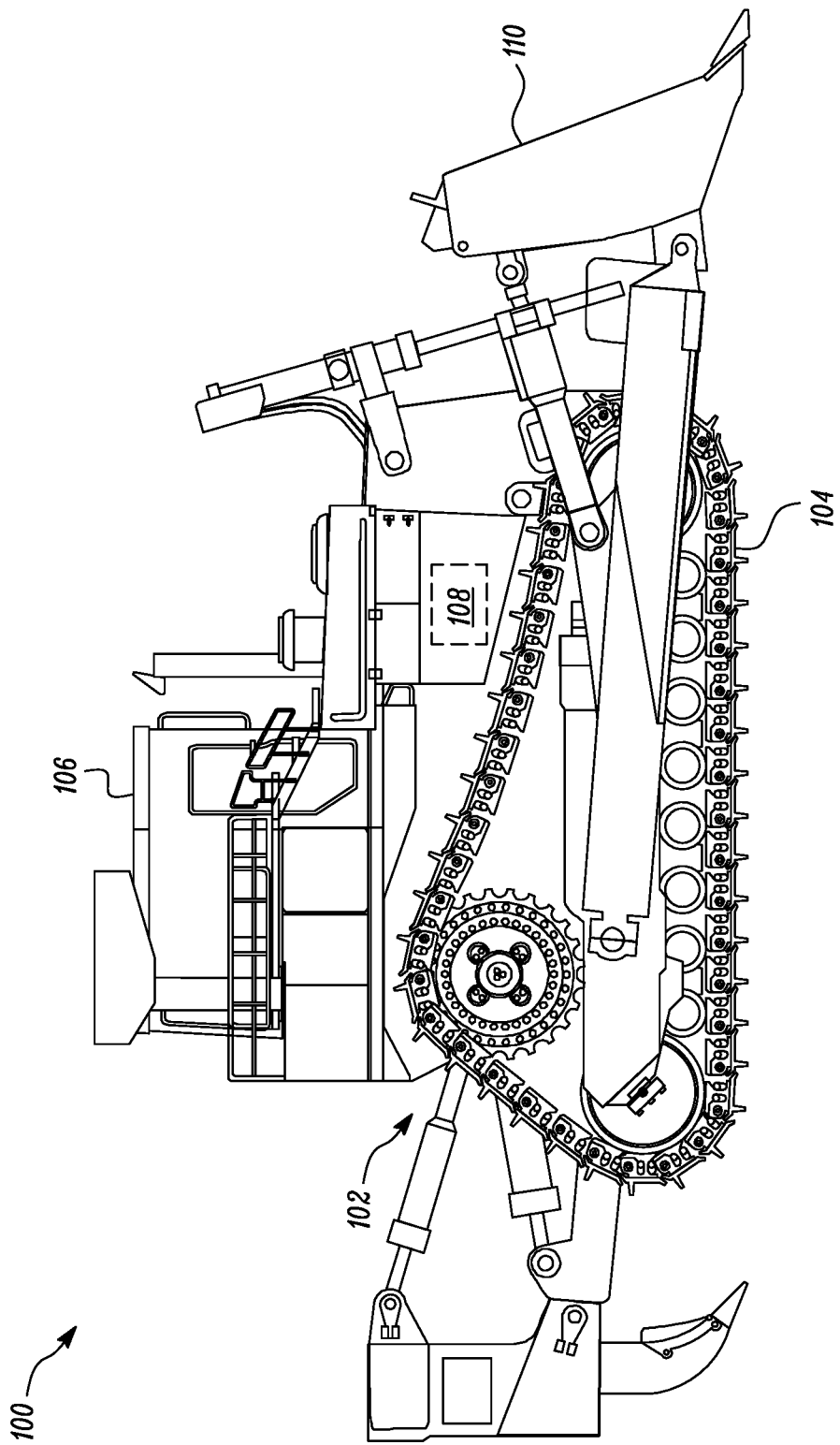
FIG. 1 illustrates a side view of a machine.
Figure 2:
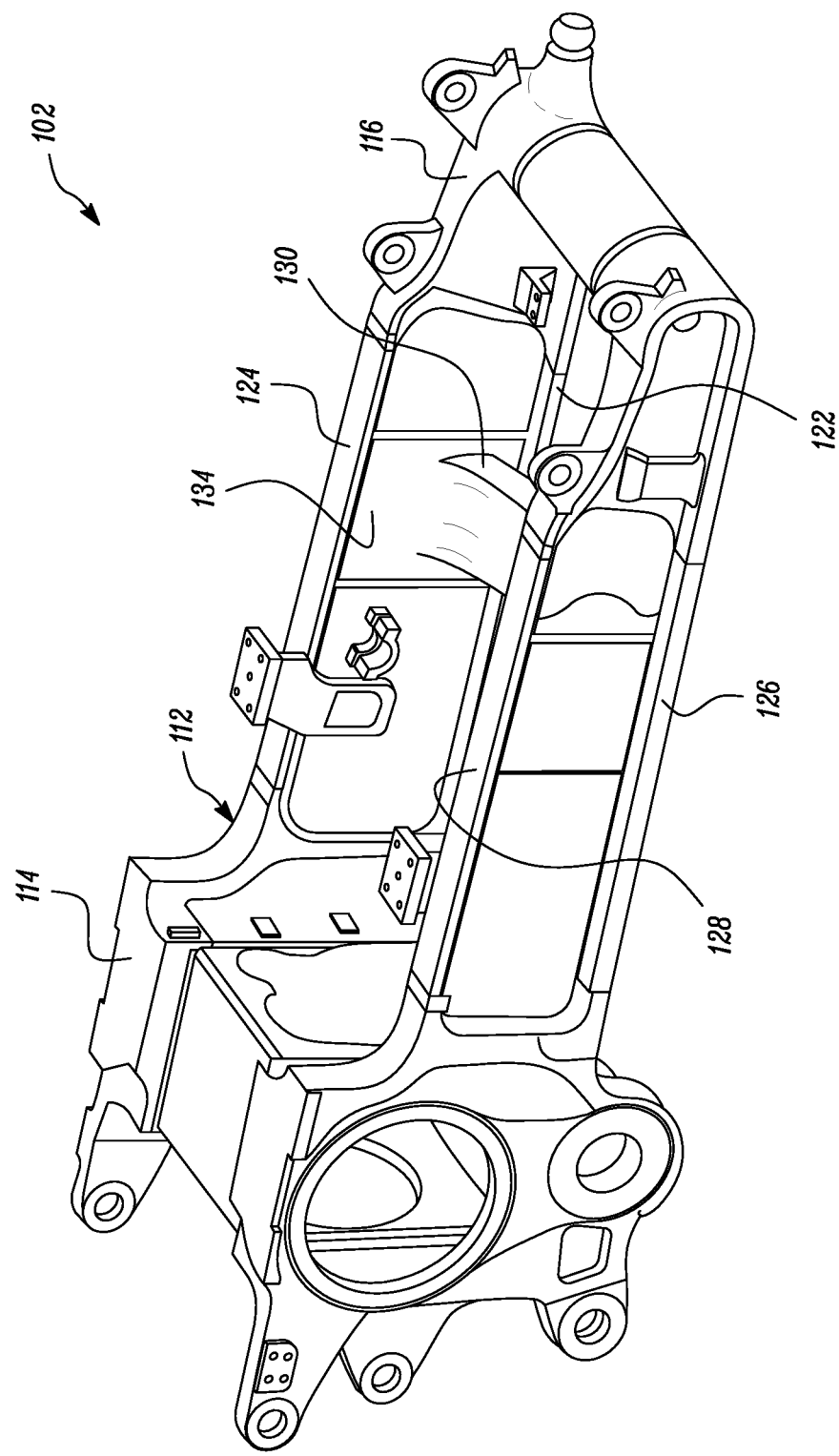
FIG. 2 illustrates a perspective view of a frame assembly of the machine.

FIG. 1 illustrates an exemplary machine 100 that incorporates a frame assembly 102 (shown in FIG. 2). The machine 100 may be configured to perform work associated with a particular industry such as, for example, mining, earth moving, construction, agriculture etc. For example, the machine 100 may be track type tractor (shown in FIG. 1), a loader, an excavator, a shovel, or any other machine.

As shown in FIG. 1, the machine 100 may include the frame assembly 102, which supports traction devices 104, a cab 106, and a power source 108, such as a hydrostatic drive or an engine, and the like. The machine 100 may further include an implement such as a bucket 110 movably coupled to the frame 102 at one end. The bucket 110 is coupled to the frame assembly 102 by a suitable linkage assembly generally known in the art. Further, the cab 106 may generally house an operator interface through which an operator may be able to operate any one or more of the traction devices 104, the power source 108, the bucket 110, and the like.

Figure 3:
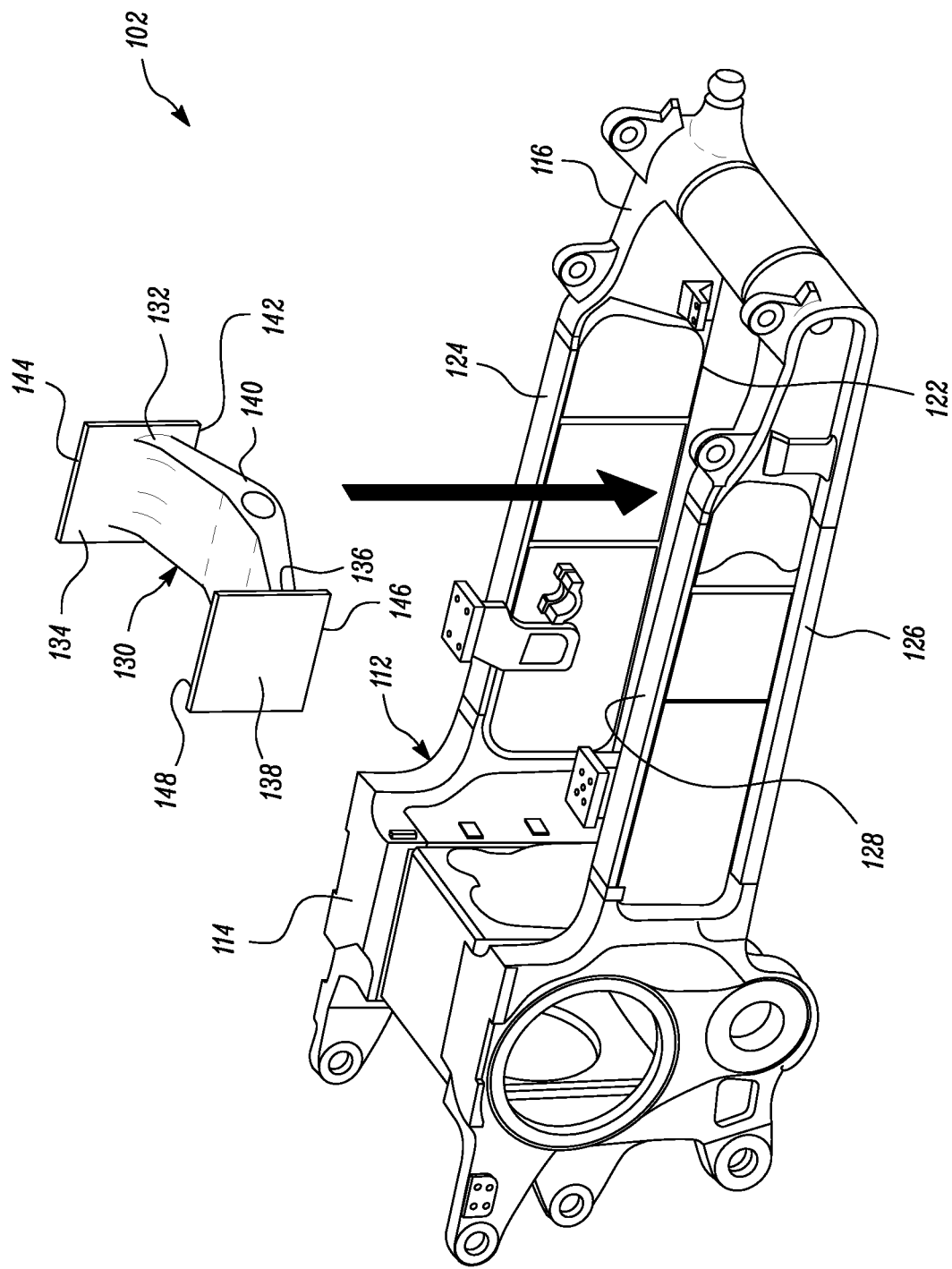
FIG. 3 illustrates an exploded view of the frame assembly depicting a crossmember and a main frame.

Referring to FIGS. 2 and 3, the frame assembly 102 includes a main frame 112 having a case 114, a bracket assembly 118, a first pair of rails 122,124, and a second pair of rails 126, 128 disposed laterally spaced apart from the first pair of rails 122, 124. Each of the first pair of rails 122,124 and the second pair of rails 126, 128 is connected to both the case 114 and the bracket assembly 118. The case 114 includes various structural elements to support and house a transmission assembly of the machine 100. The bracket assembly 118 may include various structural elements used for connecting implement and linkage assembly to the frame assembly 102.

The first pair of rails 122,124 extends along a longitudinal direction of the machine 100 and include a first rail 122 and a second rail 124. The second rails 124 is vertically spaced apart from the first rail 122. The first rail 122 and the second rail 124 are arranged substantially parallel to each other along their length. In an embodiment, the first rail 122 and the second rail 124 may be arranged such that the distance between the two rails is substantially constant along their entire length.

Similarly, the second pair of rails 126, 128 extends along a longitudinal direction of the machine 100 and include a first rail 126 and a second rail 128 disposed vertically spaced apart from the first rail 126. The first rail 126 and the second rail 128 are arranged substantially parallel to each other along their entire length. In an embodiment, the first rail 126 and the second rail 128 may be arranged such that the distance between the two rails is substantially constant along their entire length.

The frame assembly 102 further includes a crossmember 130 extending in a lateral direction of the machine 100. As shown in FIGS. 2 and 3, the crossmember 130 connected substantially in a middle portion of the main frame. 112. The crossmember 130 is connected to both the first pair of rails 122,124 and the second pair of rails 126, 128. The crossmember 130 includes a first end portion 132 having a first flange 134 and a second end portion 136 having a second flange 138. The crossmember 130 is a load bearing member and coupled to the traction devices 104 by an equalizer bar (not shown) attached to a central portion 140 of the crossmember 130. Both the first flange 134 and the second flange 138 extend vertically relative to the length of the crossmember 130. The first flange 134 and the second flange 138 are coupled to the first pair of rails 122,124 and the second pairs of rails 126, 128 respectively.

The first flange 134 includes a first end 142 and a second end 144 respectively connected to the first rail 122 and the second rail 124. In an embodiment, the first flange 134 is connected to the first pair of rails 122, 124 by welding the first end 142 and the second end 144 to the first rail 122 and the second rail 124, respectively. Similarly, the second flange 138 includes a first end 146 and a second end 148 respectively connected to the first rail 126 and the second rail 128 of the second pair of rails 126, 128. In an embodiment, the second flange 138 is connected to the second pair of rails 126, 128 by welding the first end 146 and the second end 148 to the first rail 126 and the second rail 128, respectively. Although only one crossmember 130 is shown and discussed, it being understood that the discussion is equivalently applicable to other crossmembers connected to both the first pair of rails 122, 124 and the second pair of rails 126, 128 as well.

INDUSTRIAL APPLICABILITY

In operation, the machine 100 travels at a worksite to perform work. During travel, the machine 100 may encounter an uneven terrain or various terrain features such as a bump, a ditch, a rock etc. As the machine 100 negotiates the terrain features, a sudden load may be transferred to the crossmember 130 from the traction devices 104. Thereafter, the load is transferred to both the first pair of rails 122, 124 and the second pair of rails 126, 128 via the first flange 134 and the second flange 138 of the crossmember 130. As the first flange 134 of crossmember 130 is attached directly to both the first rail 122 and the second rail 124 of the first pair of rails 122,124, at least a portion of the load is directly transferred to both the first rail 122 and the second rail 124. Such a direct transfer of the load to the first rail 122 and the second rail 124 of the first pair of rails 122,124 facilitates in reducing number of reinforcement structures mounted between the first rail 122 and the second rail 124. Similarly, the load from the crossmember 130 is directly transferred to the first rail 126 and the second rail 128 of the second pair of rails 126,128 and thereby facilitating a reduction number of reinforcement structures mounted between the first rail 126 and the second rail 128.

What is claimed is:

1. A frame assembly for a machine, the frame assembly comprising:
    a main frame including a first pair of rails and a second pair of rails laterally spaced from the first pair of rails, each of the first pair of rails and the second pair of rails having a first rail and a second rail vertically spaced from the first rail; and
    a one-piece, load-bearing crossmember having a first flange, a second flange, and a central portion between the first flange and the second flange,
    wherein the first flange is directly connected to both the first rail and the second rail of the first pair of rails, and the second flange is directly connected to both the first rail and the second rail of the second pair of rails,
    wherein the first flange includes a first end and a second end opposite the first end, the first end and the second end being directly attached to the first rail and the second rail of the first pair of rails, respectively, the first and second ends of the first flange respectively forming upper-most and lower-most surfaces of the first flange,
    wherein the second flange includes a first end and a second end opposite the first end, the first end and the second end being directly attached to the first rail and the second rail of the second pair of rails, respectively, the first and second ends of the second flange respectively forming upper-most and lower-most surfaces of the second flange,
    wherein the first flange is welded to the first rail and the second rail of the first pair of rails, and the second flange is welded to the first rail and the second rail of the second pair of rails,
    wherein the central portion of the one-piece, load-bearing crossmember extends inward and downward from the first and second flanges,
    wherein the one-piece, load-bearing crossmember has a maximum height less than a vertical spacing between the first and second rails of the first pair of rails and a vertical spacing between the first and second rails of the second pair of rails, such that no part of the one-piece, load-bearing crossmember extends in a vertical spacing direction past any of the first rails and the second rails of the first and second pairs of rails, and
    wherein the first flange and the second flange each have a uniform height at all times between the upper-most and lower-most surfaces thereof.

2. The frame assembly of claim 1, wherein the first rail and the second rail of the first pair of rails are substantially parallel to each other.

3. The frame assembly of claim 1, wherein the first rail and the second rail of the second pair of rails are substantially parallel to each other.

4. The frame assembly of claim 1,
    wherein the first flange extends in a vertical spacing direction from the first rail to the second rail of the first pair of rails, and
    wherein the second flange extends in the vertical spacing direction from the first rail to the second rail of the second pair of rails.

5. The frame assembly of claim 1, wherein the central portion includes a connection interface configured to couple the one-piece, load-bearing crossmember to an equalizer bar, the connection interface being at a center of the central portion.

6. A machine comprising:
    a main frame including a first pair of rails and a second pair of rails laterally spaced from the first pair of rails, each of the first pair of rails and the second pair of rails having a first rail and a second rail vertically spaced from the first rail; and
    a one-piece, load-bearing crossmember having a first flange, a second flange, and a central portion between the first flange and the second flange,
    wherein the first flange is directly secured to both the first rail and the second rail of the first pair of rails, and the second flange is directly secured to both the first rail and the second rail of the second pair of rails,
    wherein the first flange includes a first end and a second end opposite the first end; the first end and the second end being directly secured to the first rail and the second rail of the first pair of rails, respectively, the first and second ends of the first flange respectively forming upper-most and lower-most surfaces of the first flange,
    wherein the second flange includes a first end and a second end opposite the first end, the first end and the second end being directly secured to the first rail and the second rail of the second pair of rails, respectively, the first and second ends of the second flange respectively forming upper-most and lower-most surfaces of the second flange,
    wherein the one-piece, load-bearing crossmember has a maximum height less than a vertical spacing between the first and second rails of the first pair of rails and a vertical spacing between the first and second rails of the second pair of rails, such that no part of the one-piece, load-bearing crossmember extends in a vertical spacing direction past any of the first rails and the second rails of the first and second pairs of rails, and wherein the first flange and the second flange each have a uniform height at all times between the upper-most and lower-most surfaces thereof.

7. The machine of claim 6, wherein the first flange is welded to the first rail and the second rail of the first pair of rails, and the second flange is welded to the first rail and the second rail of the second pair of rails.

8. The machine of claim 6, wherein the first rail and the second rail of the first pair of rails are substantially parallel to each other.

9. The machine of claim 6, wherein the first rail and the second rail of the second pair of rails are substantially parallel to each other.

10. The machine of claim 6, wherein the first flange extends in a vertical spacing direction from the first rail to the second rail of the first pair of rails, and wherein the second flange extends in the vertical spacing direction from the first rail to the second rail of the second pair of rails.

11. The machine of claim 6, wherein the central portion of the one-piece, load-bearing crossmember extends inward and downward from the first and second flanges.

12. The machine of claim 6, wherein the central portion has a minimum thickness greater than a maximum thickness of each of the first and second ends of the first and second flanges.

* * * * *